(12) United States Patent
Li

(10) Patent No.: US 10,126,590 B2
(45) Date of Patent: Nov. 13, 2018

(54) DISPLAY DEVICE AND DISPLAY SYSTEM

(71) Applicant: Boe Technology Group Co., Ltd., Beijing (CN)

(72) Inventor: Wenbo Li, Beijing (CN)

(73) Assignee: BOE TECHNOLOGY GROUP CO., LTD., Beijing (CN)

(*) Notice: Subject to any disclaimer, the term of this patent is extended or adjusted under 35 U.S.C. 154(b) by 312 days.

(21) Appl. No.: 14/785,767

(22) PCT Filed: Mar. 23, 2015

(86) PCT No.: PCT/CN2015/074869
§ 371 (c)(1),
(2) Date: Oct. 20, 2015

(87) PCT Pub. No.: WO2016/074408
PCT Pub. Date: May 19, 2016

(65) Prior Publication Data
US 2016/0357062 A1 Dec. 8, 2016

(30) Foreign Application Priority Data
Nov. 14, 2014 (CN) .......................... 2014 1 0650243

(51) Int. Cl.
*G02B 27/28* (2006.01)
*G02F 1/1335* (2006.01)
(Continued)

(52) U.S. Cl.
CPC ....... *G02F 1/133528* (2013.01); *G02B 27/28* (2013.01); *G02F 1/133308* (2013.01); *G06F 21/84* (2013.01); *G02F 2001/133331* (2013.01)

(58) Field of Classification Search
CPC ......... G02F 1/133528; G02F 1/133308; G02F 1/1335; G02F 2001/133331;
(Continued)

(56) References Cited

U.S. PATENT DOCUMENTS

| 9,372,361 B2* | 6/2016 | Wicker ............. G02F 1/133528 |
| 2003/0017856 A1* | 1/2003 | Kotchick .......... G02F 1/133528 |
| | | 455/566 |

(Continued)

FOREIGN PATENT DOCUMENTS

| CN | 103091893 A | 5/2013 |
| CN | 203828271 U | 9/2014 |

(Continued)

OTHER PUBLICATIONS

Chinese Rejection Decision, for Chinese Patent Application No. 201410650243.X, dated Mar. 8, 2017, 9 pages.
(Continued)

*Primary Examiner* — Bumsuk Won
*Assistant Examiner* — Balram Parbadia
(74) *Attorney, Agent, or Firm* — Kinney & Lange, P.A.

(57) ABSTRACT

A display device being switchable between a normal display mode and an anti-peeping display mode and a display system comprising the display device are disclosed. The display device comprises: a housing; a display panel mounted within the housing and provided with a polarizer only on a light incidence side thereof, the polarizer being configured to polarize light to be incident into the display panel; and a polarization analyzing structure fitted onto the housing, and configured to selectively analyze light emitted out from an active display area of the display panel so as to achieve a normal display mode, in which a user is able to directly view an image displayed in the display device, and anti-peeping display mode, in which the user is able to view the image displayed in the display device only by means of an additional polarization analyzer, of the display device.

20 Claims, 3 Drawing Sheets

(51) Int. Cl.
*G02F 1/1333* (2006.01)
*G06F 21/84* (2013.01)

(58) Field of Classification Search
CPC .......... G02F 1/133536; G02F 1/13362; G02F 2001/133562; G02F 2001/133627; G02B 27/28; G06F 21/84; H04M 1/0266
See application file for complete search history.

(56) References Cited

U.S. PATENT DOCUMENTS

| | | | |
|---|---|---|---|
| 2007/0263140 A1* | 11/2007 | Hinata | G02F 1/133308 349/96 |
| 2009/0100732 A1* | 4/2009 | Seidler | A47F 7/147 40/729 |
| 2009/0185100 A1* | 7/2009 | Matsuhira | G02B 6/005 349/58 |
| 2009/0308511 A1* | 12/2009 | Dai | A45C 11/00 150/165 |
| 2013/0076785 A1 | 3/2013 | Chen | |

FOREIGN PATENT DOCUMENTS

| | | |
|---|---|---|
| CN | 104090410 A | 10/2014 |
| CN | 104360505 A | 2/2015 |
| CN | 204166241 U | 2/2015 |
| TW | M253786 U | 12/2004 |
| TW | M370097 U | 12/2009 |

OTHER PUBLICATIONS

Second Chinese Office Action dated Apr. 19, 2016 for Chinese Application No. 201410650243.X.
The Chinese First Office Action dated Sep. 28, 2015 for Chinese Application No. 201410650243.X.
Third Chinese Office Action dated Oct. 8, 2016 for Chinese Application No. 201410650243.X.
The Written Opinion dated Jul. 27, 2015 for the International Application No. PCT/CN2015/074869.

* cited by examiner

DISPLAY DEVICE AND DISPLAY SYSTEM

CROSS-REFERENCE TO RELATED APPLICATION

This application is a Section 371 National Stage Application of International Application No. PCT/CN2015/074869, filed 23 Mar. 2015, entitled "DISPLAY DEVICE AND DISPLAY SYSTEM", which has not yet published, and which claims priority to Chinese Application No. 201410650243.X, filed on 14 Nov. 2014, incorporated herein by reference in their entirety.

BACKGROUND OF THE INVENTION

Field of the Invention

Embodiments of the present disclosure generally relate to the field of display technologies, and particularly, to a display device and a display system.

Description of the Related Art

It is well known that liquid crystal display devices have been widely applied due to their advantages such as light and thin, low power consumption, multi-functional green display and the like, and in use, people's requirements for display secrecy of the liquid crystal display devices become increasingly higher.

In prior arts, the secrecy of the liquid crystal display device may be achieved by separating a polarization analyzing member from a display panel, that is, there is a polarizer in the display panel, while the polarization analyzing member is integrated into glasses, so that an image displayed in liquid crystal display device can only be viewed by a user who wears the above glasses, and the others who do not wear such glasses can not view information displayed on the liquid crystal display device, thereby obtaining an effect of high information secrecy and preventing use, peeping or remote shooting by other persons.

Such display device, however, only has one display mode, that is, an anti-peeping display mode, in which the user can view the image displayed in display device only by wearing polarizer glasses, and a normal view of the image can not be achieved when the anti-peeping display mode is not required, resulting in reduction in selection of display modes by the user.

SUMMARY

An object of the present disclosure is to provide a display device and a display system, the display device being switchable between two display modes including an anti-peeping display mode and a normal display mode, thereby satisfying requirements for switching of display modes from users.

According to one aspect of the present disclosure, there is provided a display device, comprising: a housing; a display panel mounted within the housing and provided with a polarizer only on a light incidence side thereof, the polarizer being configured to polarize light to be incident into the display panel; and a polarization analyzing structure fitted onto the housing, and configured to selectively analyze light emitted out from an active display area of the display panel so as to achieve a normal display mode, in which a user is able to directly view an image displayed in the display device, and an anti-peeping display mode, in which the user is able to view the image displayed in the display device only by means of an additional polarization analyzer, of the display device.

In the above display device, the polarization analyzing structure may comprise a polarization analyzer plate configured to be movable between a normal display position, in which the polarization analyzer plate at least covers the active display area of the display panel so as to analyze light emitted out from the active display area, and an anti-peeping display position in which the light emitted out from the active display area is prevented from being analyzed by the polarization analyzer plate.

The above display device may further comprise a cover body comprising a fixing part mounted to the housing, a frame part being capable of being flipped onto a light emitting side of the display panel to cover the display panel, and a connection part connecting the fixing part with the frame part; the frame part is formed with a window for exposing the active display area of the display panel, and the polarization analyzer plate is arranged on or within the frame part so as to at least cover the window, so that when the frame part is flipped onto the light emitting side to cover the display panel, the polarization analyzer plate covers the active display area exposed from the window.

In the above display device, the frame part may comprise an outer protection layer, a substrate and an inner protection layer, and each of the outer protection layer and the inner protection layer is formed into a frame type structure, so that when the frame part covers the display panel, the outer protection layer, the substrate, the polarization analyzer plate and the inner protection layer are arranged in order in a direction from one side of the frame part facing the display panel towards the other side of the frame part away from the display panel.

In the above display device, the substrate may comprise a polycarbonate PC plate, a glass fiber plate, a metal fiber plate, a rubber sheet, a paper card or a metal plate; the outer protection layer may comprise an artificial leather layer, a genuine leather layer, a TPU leather layer, a leather and fur layer or a metal layer; and/or the inner protection layer may be made of a soft material.

In the above display device, the inner protection layer may be made of flannelette, leather material, suede or microfiber material.

In the above display device, a metal support sheet may be provided on a side of the outer protection layer away from the inner protection layer.

In the above display device, the substrate may be made of a transparent material and is configured to at least cover the active display area of the display panel when the frame part covers over the display panel.

In the above display device, the frame part may be a metal frame made of a metal material or a plastic frame made of a plastic material; and the frame part may be stuck, or be riveted by a rivet, or be clamped and connected by a buckle and a clasp, to the connection part.

In the above display device, the polarization analyzer plate may be a hardened polarizer or toughened polarizer.

In the above display device, one of the housing and the frame part may be made of a magnetic material, and the other one may be provided therein or thereon with at least one magnet, so that the frame part is magnetically connected to the housing when the frame part covers over the display panel.

In the above display device, the housing may be provided therein or thereon with at least one first magnet, and the frame part may be provided therein or thereon with at least one second magnet, so that the first magnet is magnetically connected to the second magnet when the frame part covers over the display panel.

In the above display device, the fixing part may be stuck by a Velcro, or be riveted by a rivet, or be connected by a bolt, to the housing.

According to another aspect of the present disclosure, there is provided a display system, comprising any display device described above, and a polarization analyzer used in the anti-peeping display mode of the display device by the user for viewing the image displayed in the display device.

In the display system, the polarization analyzer may include polarization analyzing glasses.

DETAILED DESCRIPTION OF PREFERRED EMBODIMENTS

Figure 1:
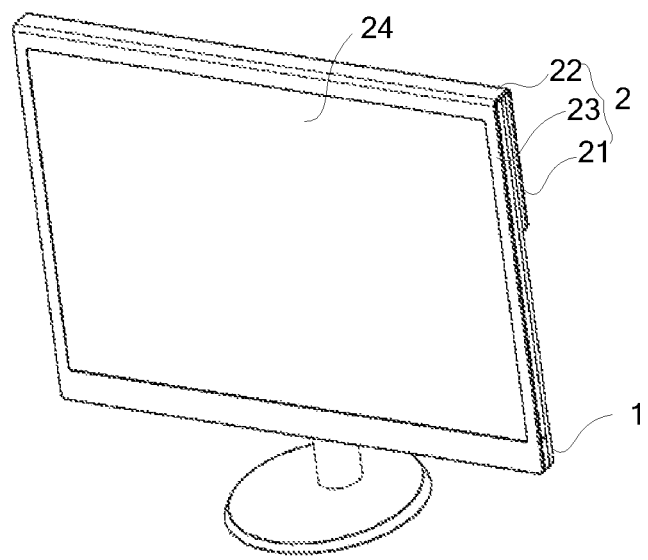
FIG. 1 is a structural schematic diagram of a display device provided according to one embodiment of the present disclosure.

Technique solution in embodiments of the present disclosure will be described clearly and thoroughly hereinafter with reference to drawings in the embodiments of the present disclosure. Obviously, the described embodiments are only some, rather than all, of the embodiments of the present disclosure. Based on the embodiments of the present disclosure, all of other embodiments obtained by those skilled in the art without any creative work will fall within the scope of the present invention.

According to a general concept of the present invention, there is provided a display device comprising a housing, a display panel and a polarization analyzing structure fitted onto the housing, the display panel is provided with a polarizer only on a light incidence side thereof, for polarizing light to be incident into the display panel, the polarization analyzing structure is configured to selectively analyze light emitted out from an active display area of the display panel so as to achieve a normal display mode and an anti-peeping display mode of the display device. In the normal display mode, light emitted out from the active display area of the display panel is analyzed by the polarization analyzing structure so that a user is able to directly view an image displayed in the display device, and in the anti-peeping display mode, light emitted out from the active display area of the display panel is prevented from being analyzed by the polarization analyzing structure such that the user is able to view the image displayed in the display device only by means of an additional polarization analyzer.

In the present disclosure, the selective analyzing of light emitted out from the active display area of the display panel by the polarization analyzing structure may be performed in various ways. In one example, the polarization analyzing structure may be fixedly or detachably mounted in front of a light emitting face of the display panel, and can be automatically or electrically changed in its property or configuration under control of a control device, so as to be switched between a polarization analyzing state and a non-polarization analyzing state. In the polarization analyzing state, light emitted out from the active display area of the display panel is analyzed by the polarization analyzing structure so that a user or viewer is able to directly view an image displayed in the display device, while in the non-polarization analyzing state, the polarization analyzing structure does not provide the polarization analyzing function, that is, light emitted out from the active display area of the display panel is allowed to pass through the polarization analyzing structure without being analyzed, such that the user or viewer can view the image displayed in the display device only by means of an additional polarization analyzer such as analyzer glasses.

In one alternative example, the polarization analyzing structure may be fitted onto the housing and is manually or automatically movable, for example, rotatable, translatable or flippable, between a normal display position and an anti-peeping display position. In the normal display position, the polarization analyzing structure covers at least the active display area of the display panel so as to analyze light emitted out from the active display area, and in the anti-peeping display position, light emitted out from the active display area is prevented from being analyzed or is not analyzed by the polarization analyzing structure, such that light exiting from display device is non-analyzed light and the user or viewer can view the image displayed in the display device only by means of an additional polarization analyzer, thereby achieving an anti-peeping function. The above polarization analyzing structure may comprise a polarization analyzer plate.

Figure 2:
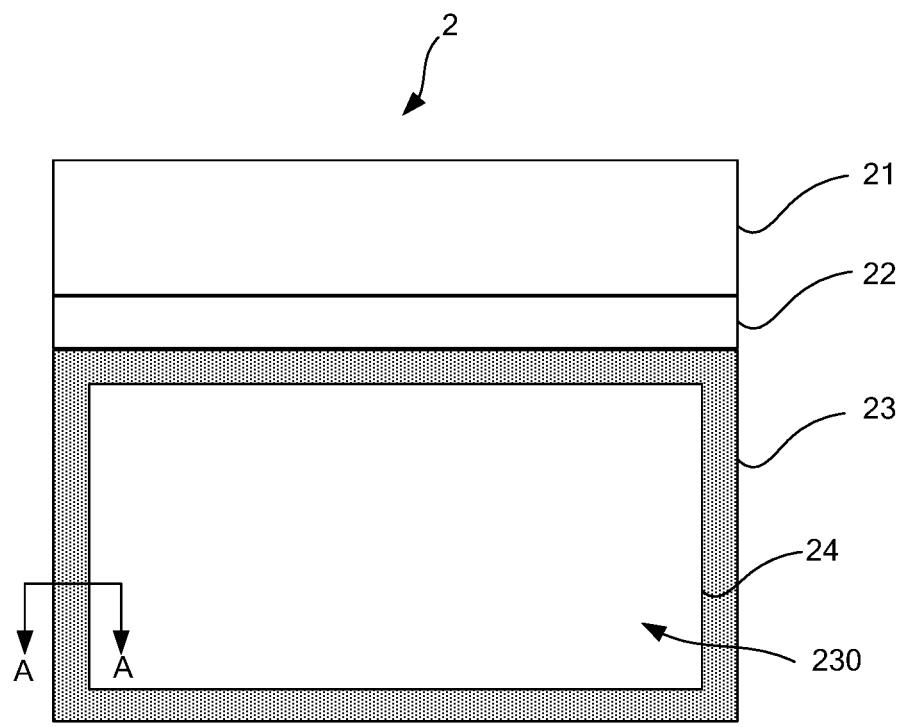
FIG. 2 is a structural schematic diagram of a cover body in an unfolded state in a display device provided according to one embodiment of the present disclosure.

With reference to FIG. 1 and FIG. 2, FIG. 1 is a structural schematic diagram of a display device provided according to one embodiment of the present disclosure; and FIG. 2 is a structural schematic diagram of a cover body in an unfolded state in a display device provided according to one embodiment of the present disclosure.

As shown in FIG. 1, the display device provided according to embodiments of the present disclosure comprises:

a housing 1;

a display panel mounted within the housing 1 and provided, only on a light incidence side thereof, with a polarizer for polarizing light to be incident into the display panel; no polarizer for analyzing is arranged on a light emitting side of the display panel so that light exiting from the light emitting side of the display panel is non-analyzed light; and a cover body 2, as shown in FIGS. 1 and 2, the cover body 2 comprises a fixing part 21 mounted to the housing 1, a frame part 23 being capable of being flipped onto the light emitting side of the display panel to cover the display panel, and a connection part 22 connecting the fixing part 21 with the frame part 23; the frame part 23 is formed with a window 230 for exposing an active display area of the display panel, and a polarization analyzer plate 24 is arranged on or within the frame part 23 so as to at least cover the window 230, so that when the frame part is flipped onto the light emitting side to cover the display panel, the polarization analyzer plate 24 at least covers the active display area exposed from the window 230.

Figure 3:
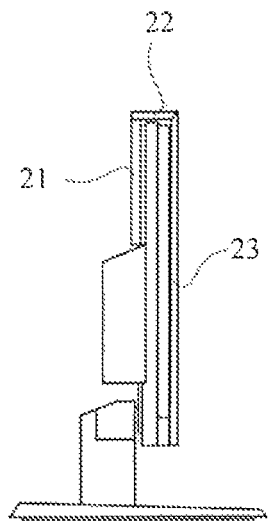
FIG. 3 to FIG. 5 are state schematic diagrams showing switching of a display device provided according to one embodiment of the present disclosure from a normal display mode to an anti-peeping display mode.
Figure 4:
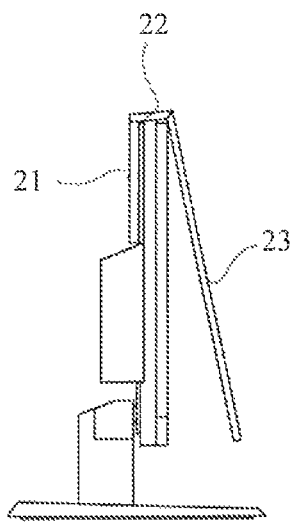
Figure 5:
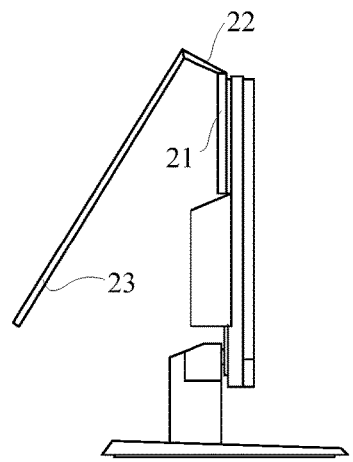

In the above display device, the fixing part 21 of the cover body 2 is fixed onto the housing 1; as shown in FIG. 3, when the frame part 23 of the cover body 2 is flipped onto the light emitting side and covers the display panel, the polarization analyzer plate 24 arranged on the frame part 23 can analyze light emitted out from the light emitting face of the display panel, thereby realizing a normal display mode of the display device; when it is required to switch the display device from the normal display mode to an anti-peeping display mode, the frame part 21 of the cover body 2 is flipped firstly, as shown in FIG. 4, and when the frame part 21 of the cover body 2 is flipped onto a back side of the housing 1, as shown in FIG. 5, light emitted out from light emitting face of the display panel is not analyzed by the polarization analyzer plate 24; at this time, information displayed by display device can only be viewed by a viewer who wears dedicated polarization analyzing glasses, while viewers who do not wear the glasses can not see clearly the information displayed by display device, thereby enabling the anti-peeping display mode of the display device.

Thus, the above display device can be switched between two display modes, that is, the normal display and the anti-peeping display, by flipping the frame part 23 of the cover body 2, thereby satisfying requirements for switching and selecting display modes by users.

Figure 6:
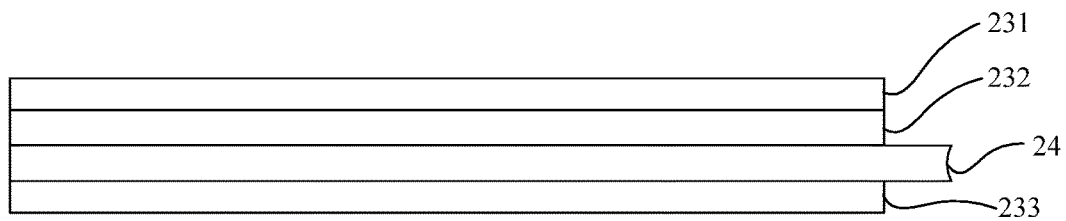
FIG. 6 is a cross sectional view of the cover body of the display device provided according to one embodiment of the present disclosure, taken from line A-A shown in FIG. 2.

In one preferred embodiment, as shown in FIG. 6, the frame part 23 of the cover body 2 comprises an outer protection layer 231, a substrate 232 and an inner protection layer 233, each of the outer protection layer 231 and the inner protection layer 233 is formed into a frame type structure having a window, so that when the frame part 23 covers the display panel, the outer protection layer 231, the substrate 232, the polarization analyzer plate 24 and the inner protection layer 233 are arranged in order in a direction from one side of the frame part 23 facing the display panel towards the other side of the frame part 23 away from the display panel, and the polarization analyzer plate 24 as least covers or shields the window. With the outer protection layer 231, not only the substrate 232 can be protected, but also user's aesthetic demands can be met by selecting materials and patterns for the outer protection layer 231. Meanwhile, with the inner protection layer, the polarization analyzer plate 24 can be protected, so that damage to the polarization analyzer plate 24 caused when the frame part 23 covers the display panel can be reduced. Alternatively, the polarization analyzer plate may be arranged between the outer protection layer and the substrate.

Specifically, in the frame part 23 of the cover body 2:

the substrate 232 may comprise a polycarbonate PC plate, a glass fiber plate, a metal fiber plate, a rubber sheet, a paper card, a metal plate or the like, and may be selected as desired; with the substrate made of a non-transparent material, a window is formed in the substrate so as to at least expose the active display area of the display panel, in such as case, windows formed in the outer protection layer, in the substrate and in the inner protection layer may have substantially the same size, or it is only required that the smallest window can expose the active display area of the display panel;

the outer protection layer 231 may comprise an artificial leather layer, a genuine leather layer, a TPU leather layer, a leather and fur layer, a metal layer or the like, and may be selected according to different appearance requirements of clients;

preferably, the inner protection layer 233 in the above frame part 23 is an inner protection layer made of a soft material, which can buffer a force applied on the light emitting face of the display panel by the frame part 23 when the frame part 23 covers over the display panel, while reducing friction between the frame part 23 and the light emitting face of the display panel.

More preferably, the inner protection layer 233 may be an inner protection layer made of flannelette, leather material, suede, or microfiber material.

In one preferred embodiment, in order to increase a mechanical strength of the frame part 23, a metal support sheet is arranged in the frame part 23 on a side of the outer protection layer 231 away from the inner protection layer 233. The metal support sheet has a higher mechanical strength so as to increase the mechanical strength of the frame part 23, thereby improving planeness of the frame part when the frame part 23 covers over the display panel and display quality of the display device in the normal display mode.

In one preferred embodiment, the substrate 232 in the frame part 23 may be a substrate made of a transparent material, and is configured to cover the active display area of the display panel when the frame part 23 covers over the display panel. That is, the substrate 232 has a plate-like structure, and a portion of the polarization analyzer plate 24 within the window is adhered onto the substrate 232, so that the substrate 232 can provide support to the polarization analyzer plate 24 so as to prevent defects such as corrugation and the like from occurring in the polarization analyzer plate 24.

Of course, in order to prevent defects such as corrugation and the like from occurring in the polarization analyzer plate 24, the above polarization analyzer plate 24 may also be a hardened polarizer or toughened polarizer. The mechanical strength of the polarization analyzer plate 24 is sufficiently large so that defects such as corrugation and the like will not occur in the polarization analyzer plate 24.

Preferably, the frame part 23 of the cover body 2 may also be a metal frame made of a metal material or a plastic frame made of a plastic material; and the frame part 23 is stuck, or is riveted by a rivet, or is clamped and connected by a buckle and a clasp, to the connection part 22. The metal frame or plastic frame can also provide a good mechanical strength for the frame part 23, and meanwhile, the frame part 23 may be connected with the connection part 22 in other fixed or detachable ways, which will not be described one by one herein.

Figure 7:
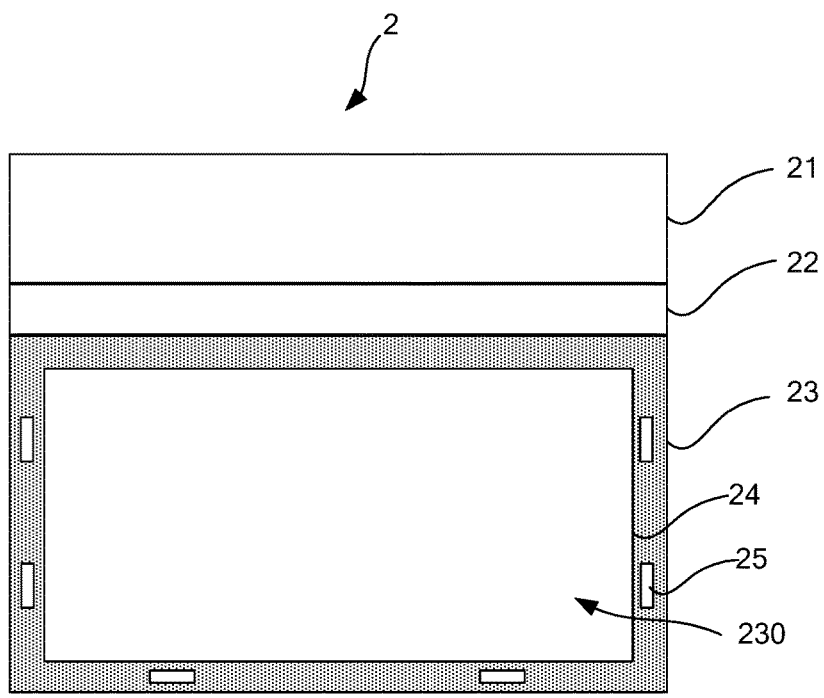
FIG. 7 is a structural schematic diagram of a cover body in an unfolded state in a display device provided according to another embodiment of the present disclosure.

In order to improve stability of the match between the frame part 23 and the display panel when the frame part 23 covers over the display panel, one of the housing and the frame part may be made of a magnetic material, and the other one is provided therein and/or thereon with at least one magnet, so that the frame part is magnetically connected to the housing when the frame part covers over the display panel. For example, as shown in FIG. 7, the housing 1 of the display device may be a magnetic metal housing, and the frame part 23 is provided therein and/or thereon with at least one magnet 25, so that the magnet 25 is magnetically connected with the housing when the frame part 23 covers over the display panel. Of course, it is also possible that the housing 1 is provided therein and/or thereon with at least one first magnet, and the frame part 23 is provided therein and/or thereon with at least one second magnet, so that the first magnet is magnetically connected with the second magnet (not shown) when the frame part 23 covers over the display panel. When the frame part 23 covers over the display panel, the frame part 23 connects and mates with the housing 1 through the magnetic connection, so that the position of the frame part 23 is constrained, thereby enabling improvement of the stability of the match between the frame part 23 and the display panel when the frame part 23 covers over the display panel.

Specifically, connection between the fixing part 21 of the cover body 2 and the housing 1 may be achieved in various ways; for example, the fixing part 21 may be stuck by a Velcro, or be riveted by a rivet, or be connected by a bolt, to the housing 1. Of course, the fixing part 21 may be clamped and connected by a buckle and a clasp to the housing 1.

In addition, embodiments of the present disclosure further provide a display system comprising the display device provided according to any one of the above embodiments, and a polarization analyzer used in the anti-peeping display mode of the display device by the user for viewing the image displayed in the display device. In one example, the polarization analyzer may include polarization analyzing glasses.

It will be obvious that various changes and modifications may be made to the embodiments of the present disclosure by those skilled in the art without departing from spirit and scope of the disclosure. Thus, in case that these changes and modifications of the present disclosure fall within scopes of claims and equivalents thereof, these changes and modifications are intended to be included within the present disclosure.

What is claimed is:

1. A display device, comprising: a housing; a display panel mounted within the housing and provided with a polarizer only on a light incidence side thereof, the polarizer being configured to polarize light to be incident into the display panel; and a polarization analyzing structure fitted onto the housing, and configured to be automatically or electrically changed in its property or configuration to be switched between a polarization analyzing state and a non-polarization analyzing state, and to thereby selectively analyze light emitted out from an active display area of the display panel so as to achieve a normal display mode of the display device, in which the polarization analyzing structure is at a light emitting side of the display panel and in the polarization analyzing state to analyze light emitted out from the active display area of the display panel so that a user is able to directly view an image displayed in the display device, and an anti-peeping display mode of the display device, and in which the polarization analyzing structure remains at the light emitting side of the display panel and in the non-polarization analyzing state to allow the light emitted out from the active display area of the display panel to pass through the polarization analyzing structure without being analyzed so that the user is able to view the image displayed in the display device only by means of an additional polarization analyzer.

2. The display device according to claim 1, wherein
the polarization analyzing structure comprises a polarization analyzer plate configured to be movable between a normal display position, in which the polarization analyzer plate at least covers the active display area of the display panel so as to analyze light emitted out from the active display area, and an anti-peeping display position in which the light emitted out from the active display area is prevented from being analyzed by the polarization analyzer plate.

3. The display device according to claim 2, wherein the display device further comprises:
a cover body comprising a fixing part mounted to the housing, a frame part being capable of being flipped onto a light emitting side of the display panel to cover the display panel, and a connection part connecting the fixing part with the frame part;
wherein the frame part is formed with a window for exposing the active display area of the display panel, and the polarization analyzer plate is arranged on or within the frame part so as to at least cover the window, so that when the frame part is flipped onto the light emitting side to cover the display panel, the polarization analyzer plate covers the active display area exposed from the window.

4. The display device according to claim 3, wherein the frame part comprises an outer protection layer, a substrate and an inner protection layer, and each of the outer protection layer and the inner protection layer is formed into a frame type structure, so that when the frame part covers the display panel, the outer protection layer, the substrate, the polarization analyzer plate and the inner protection layer are arranged in order in a direction from one side of the frame part facing the display panel towards the other side of the frame part away from the display panel.

5. The display device according to claim 4, wherein in the frame part:
the substrate is selected from the group consisting of a polycarbonate (PC) plate, a glass fiber plate, a metal fiber plate, a rubber sheet, a paper card, and a metal plate;
the outer protection layer is selected from the group consisting of an artificial leather layer, a genuine leather layer, a thermoplastic polyurethane (TPU) leather layer, a leather and fur layer, and a metal layer; and
the inner protection layer is an inner protection layer made of a soft material.

6. The display device according to claim 5, wherein the inner protection layer is made of flannelette, leather material, suede, or micro fiber material.

7. The display device according to claim 4, wherein a metal support sheet is provided on a side of the outer protection layer away from the inner protection layer.

8. The display device according to claim 4, wherein the substrate is made of a transparent material and is configured to at least cover the active display area of the display panel when the frame part covers the display panel.

9. The display device according to claim 4, wherein the polarization analyzer plate is selected from the group consisting of a hardened polarizer and a toughened polarizer.

10. The display device according to claim 4, wherein one of the housing and the frame part is made of a magnetic material, and the other one is provided therein or thereon with at least one magnet, so that the frame part is magnetically connected to the housing when the frame part covers the display panel.

11. The display device according to claim 4, wherein the housing is provided therein or thereon with at least one first magnet, and the frame part is provided therein or thereon with at least one second magnet, so that the first magnet is magnetically connected to the second magnet when the frame part covers the display panel.

12. The display device according to claim 4, wherein the fixing part is stuck by a hook-and-loop fastener material, or is riveted by a rivet, or is connected by a bolt, to the housing.

13. A display system, comprising:
the display device according to claim 4, and
a polarization analyzer used in the anti-peeping display mode of the display device by the user for viewing the image displayed in the display device.

14. The display device according to claim 3, wherein the frame part is a metal frame made of a metal material or a plastic frame made of a plastic material; and the frame part is stuck, or is riveted by a rivet, or is clamped and connected by a buckle and a clasp, to the connection part.

15. The display device according to claim 3, wherein one of the housing and the frame part is made of a magnetic material, and the other one is provided therein or thereon with at least one magnet, so that the frame part is magnetically connected to the housing when the frame part covers the display panel.

16. The display device according to claim 3, wherein the housing is provided therein or thereon with at least one first magnet, and the frame part is provided therein or thereon with at least one second magnet, so that the first magnet is magnetically connected to the second magnet when the frame part covers the display panel.

17. The display device according to claim 3, wherein the fixing part is stuck by a hook-and-loop fastener material, or is riveted by a rivet, or is connected by a bolt, to the housing.

18. The display device according to claim 1, wherein the polarization analyzer plate comprises a hardened polarizer or a toughened polarizer.

19. A display system, comprising:
   the display device according to claim 1, and
   a polarization analyzer used in the anti-peeping display mode of the display device by the user for viewing the image displayed in the display device.

20. The display system according to claim 19, wherein the polarization analyzer comprises polarization analyzing glasses.

* * * * *